United States Patent
Delvecchio et al.

(10) Patent No.: US 12,441,463 B2
(45) Date of Patent: Oct. 14, 2025

(54) TRANSMISSION ASSEMBLY FOR AN AIRCRAFT CAPABLE OF HOVERING

(71) Applicant: LEONARDO S.P.A., Rome (IT)

(72) Inventors: Gabriele Delvecchio, Samarate (IT); Marco Ernesto Tamborini, Samarate (IT); Paolo Pisani, Samarate (IT); Diego Scaltritti, Samarate (IT); Lorenzo Alari, Samarate (IT)

(73) Assignee: LEONARDO S.P.A., Rome (IT)

( * ) Notice: Subject to any disclaimer, the term of this patent is extended or adjusted under 35 U.S.C. 154(b) by 0 days.

(21) Appl. No.: 18/846,406

(22) PCT Filed: Jan. 26, 2023

(86) PCT No.: PCT/IB2023/050657
§ 371 (c)(1),
(2) Date: Sep. 12, 2024

(87) PCT Pub. No.: WO2023/175403
PCT Pub. Date: Sep. 21, 2023

(65) Prior Publication Data
US 2025/0206443 A1    Jun. 26, 2025

(30) Foreign Application Priority Data
Mar. 14, 2022   (EP) ..................... 22161958

(51) Int. Cl.
*B64C 27/14*    (2006.01)
*F16H 57/04*    (2010.01)
(52) U.S. Cl.
CPC ......... *B64C 27/14* (2013.01); *F16H 57/0435* (2013.01); *F16H 57/0442* (2013.01)
(58) Field of Classification Search
CPC ............. F16H 57/0442; F16H 57/0435; F16H 57/0456; B64C 27/14
See application file for complete search history.

(56) References Cited

U.S. PATENT DOCUMENTS

| | | | |
|---|---|---|---|
| 7,651,049 B2 * | 1/2010 | Carnelli | F16N 9/02 184/65 |
| 7,882,932 B2 * | 2/2011 | Regonini | B64C 27/006 184/6.12 |

(Continued)

FOREIGN PATENT DOCUMENTS

| | | |
|---|---|---|
| EP | 1739012 A1 | 1/2007 |
| EP | 2505878 B1 | 6/2013 |

(Continued)

OTHER PUBLICATIONS

International Search Report and Written Opinion in PCT Application No. PCT/IB2023/050657, mailed Apr. 4, 2023 (11 pages).

*Primary Examiner* — Thomas E Lazo
(74) *Attorney, Agent, or Firm* — Leason Ellis LLP

(57) ABSTRACT

Transmission assembly for an aircraft capable of hovering, comprising: a first and a second member and support means of the first member with respect to the second member; a primary lubrication circuit comprising a primary tank of a lubricating fluid and primary fluidic supply means for supplying fluid to the support means; and an emergency lubrication circuit comprising an emergency tank of lubricating fluid fluidically connected to the primary tank; and auxiliary fluidic supply means of the lubricating fluid to the support means, comprising a nozzle; the auxiliary fluidic supply means comprise a dosing device and a fluidic line, which fluidically connects the emergency tank with the dosing device; the dosing device comprising a passage for the lubricating fluid from the fluidic line to the nozzle, which comprises a plurality of concentrated pressure drop sections, which are distinct and spaced apart from each other.

14 Claims, 5 Drawing Sheets

(56) References Cited

U.S. PATENT DOCUMENTS 10,145,464 B2 * 12/2018 Poster .................... B64C 27/12
11,193,514 B2    12/2021 Whynall

FOREIGN PATENT DOCUMENTS

EP    3854682 A1    7/2021
JP    4880382 B2    2/2012

* cited by examiner

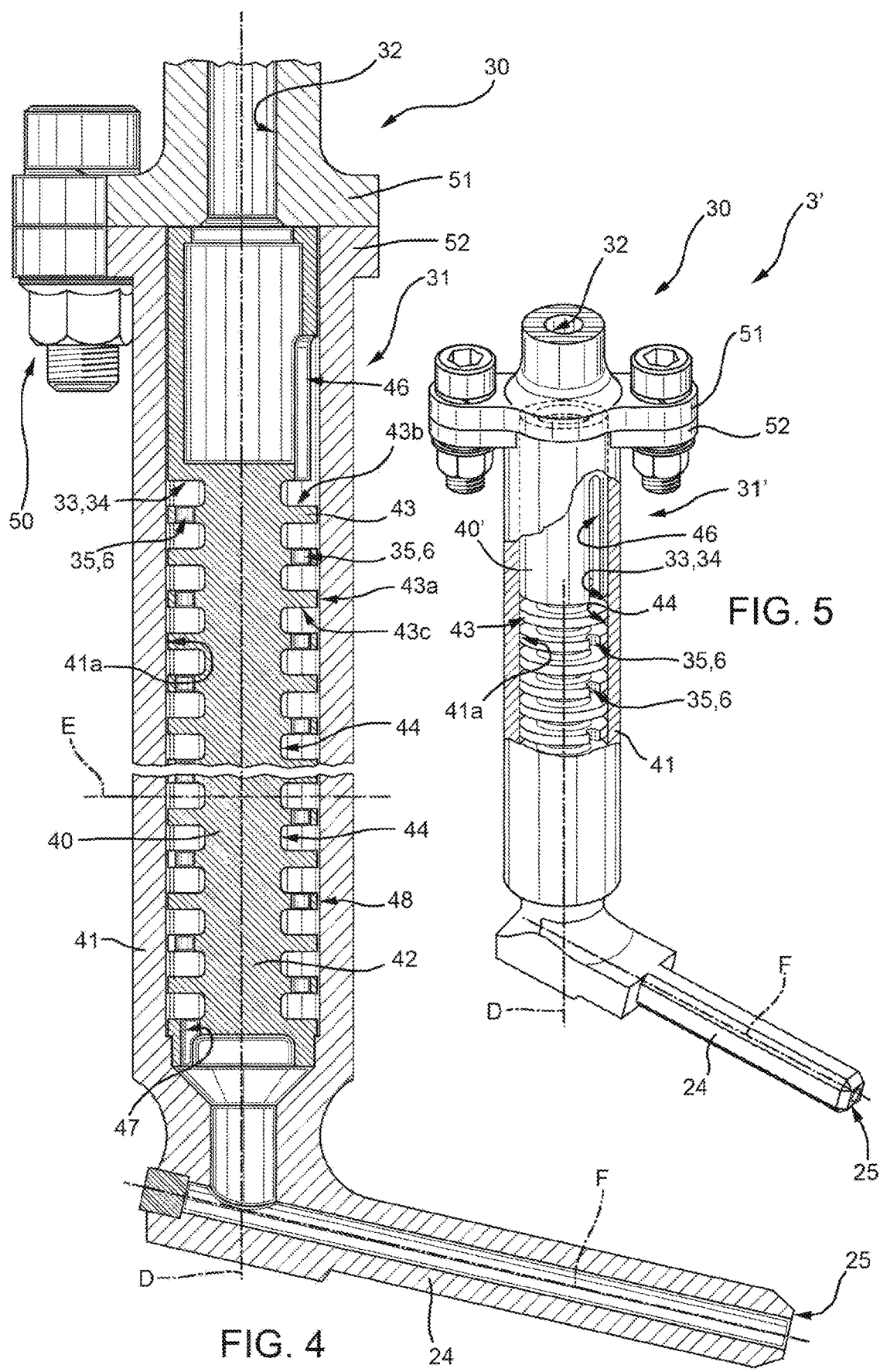

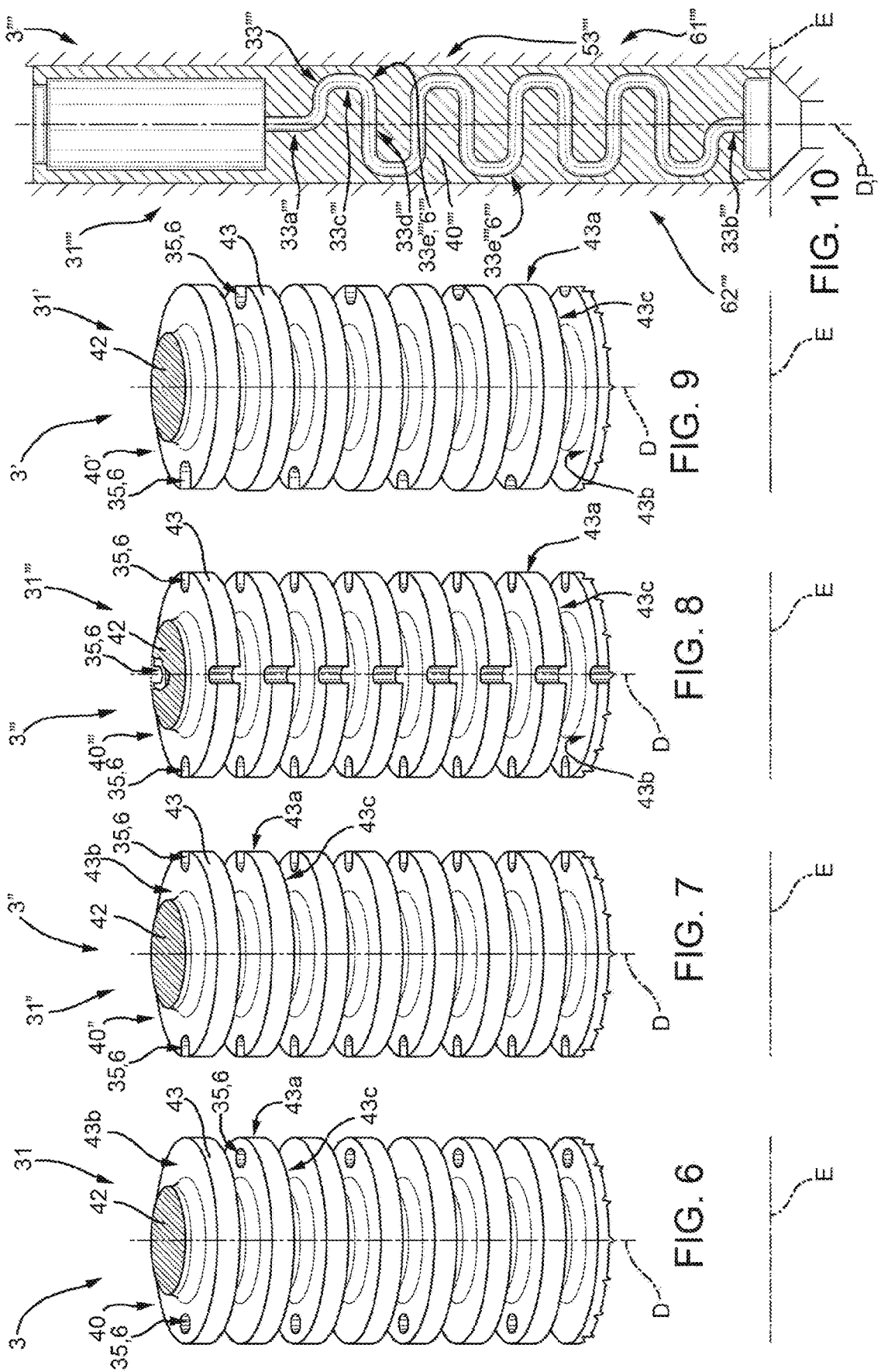

TRANSMISSION ASSEMBLY FOR AN AIRCRAFT CAPABLE OF HOVERING

CROSS-REFERENCE TO RELATED APPLICATIONS

This patent application is a U.S. National Phase Application under 35 U.S.C. § 371 of International Patent Application No. PCT/IB2023/050657, filed on Jan. 26, 2023, which claims priority from European Patent Application No. 22161958.8 filed on Mar. 14, 2022, all of which are incorporated by reference as if expressly set forth in their respective entireties herein.

TECHNICAL FIELD

The present invention relates to a transmission assembly for an aircraft capable of hovering.

BACKGROUND

Aircrafts capable of hovering are known essentially comprising a fuselage, a main rotor placed at a top of the fuselage and rotatable around its own axis, and an antitorque rotor arranged at a tail end of the fuselage.

Aircrafts also comprise, in a known way, one or more motor members, example turbines, and a for assembly interposed between the turbines transmission and the main rotor and adapted to transmit the motion from the turbines to the main rotor itself. Aircrafts may also comprise further transmission assemblies, which are adapted to transmit motion from the turbines to a plurality of accessory devices designed, for example, to provide the energy necessary for the operation of the on-board equipment.

In general, the transmission assemblies comprise at least two members that are movable relative to each other and a plurality of support members, for example bearings, which allow relative movement between the two members.

During the operation of the aircraft, it is essential to ensure proper lubrication of the transmission assembly, as inadequate lubrication conditions could be critical to the entire aircraft. To this end, the aircrafts comprise a circuit for lubricating the members of the transmission assembly.

In addition, some certification regulations require that the transmission assemblies be adequately lubricated for a certain time interval, for example at least 30 minutes, following a possible failure of the lubrication circuit. For this reason, the aircrafts have been equipped with emergency lubrication devices.

By way of example, EP-A1-1739012 describes a helicopter comprising:
a primary lubrication circuit having a primary tank; and
an emergency lubrication circuit having an emergency tank, which is continuously fed by the primary tank.

The primary and emergency lubrication circuits comprise respective nozzles, through which the lubricating oil is allowed to flow out. In detail, the passage section of the nozzle of the emergency circuit has a smaller extension than the extension of the passage section of the primary circuit nozzle. In further detail, when crossing the emergency circuit nozzle, the lubricating oil undergoes a distributed pressure drop, which is correlated to the length of the emergency circuit nozzle.

This allows a certain amount of oil to accumulate in the emergency tank and thus to ensure a flow of lubricating oil to the components of the transmission assembly for a period of time following a possible failure of the primary circuit. In particular, the flow of lubricating oil is directed towards the components of the transmission assembly that are considered to be more prone to temperature increases under inadequate lubrication conditions, particularly the bearings.

However, the Applicant noted that solutions such as the one shown in EP-A1-1739012 leave room for some improvements. In particular, in the presence of air bubbles in the lubricating oil, these tend to obstruct the outlet mouth of the nozzles of the emergency circuit, altering the flow of the oil and reducing its stability over time. Such alterations in oil flow could result in insufficient lubrication of the transmission assembly during emergency conditions.

Specifically, it was observed that smaller dimensions of the passage section of the nozzles of the emergency circuit correspond to longer intervals of emergency lubrication. However, particularly small dimensions of this passage section tend to be comparable to the characteristic dimensions of air bubbles.

In addition, since in the solution shown in EP-A1-1739012 the pressure drop at the nozzle of the emergency circuit is of the distributed type, the time for emptying the emergency tank is not adjustable once the length of the nozzle itself has been defined.

Other solutions are known from EP-B1-2505878 and US-B2-11193514.

EP-A1-3854682 discloses a transmission lubricating structure including a power transmitting shaft, a main lubricating circuit, and an auxiliary lubricating circuit. The power transmitting shaft includes an ejection hole through which an internal space of the power transmitting shaft communicates with an outside of the power transmitting shaft. The main lubricating circuit includes: a main nozzle having a nozzle hole through which lubricating oil supplied from a main tank is discharged to the internal space of the power transmitting shaft; and a hydraulic pump configured to supply the lubricating oil by pressure from the main tank to the main nozzle. The auxiliary lubricating circuit includes an auxiliary nozzle arranged lower than an auxiliary tank and higher than a lubrication target at the outside of the power transmitting shaft, the auxiliary nozzle being configured to drop the lubricating oil, supplied from the auxiliary tank by an own weight of the lubricating oil, toward the lubrication target.

JP-B2-4880382 discloses a helicopter comprising a first member movable with respect to a second member; lubricated supporting means for supporting the first member with respect to the second member; and a primary lubricating circuit for lubricating the supporting means and in turn primary having storage means for accumulating a lubricating fluid, and primary fluid feed means for feeding the lubricating fluid to the supporting means. The helicopter further comprises an auxiliary lubricating circuit supplying the lubricating fluid continually from the primary storage means at a first lubricating fluid flow rate, and continually supplying the fluid to the supporting means at a second lubricating fluid flow rate lower than the first rate, so as to produce an auxiliary reservoir of lubricating fluid for use in the event of breakdown of the primary lubricating circuit.

Therefore, there is a need in the sector to ensure an oil flow for emergency lubrication of the transmission assembly that is as stable as possible over time.

Aim of the present invention is to realize a transmission assembly for an aircraft capable of hovering which enables the above requirement to be met simply and economically.

SUMMARY

The aforesaid aim is achieved by the present invention, as it relates to a transmission assembly as defined in claim 1.

BRIEF DESCRIPTION OF THE DRAWINGS

For a better understanding of the present invention, five preferred embodiments are described below, by way of non-limiting example only and with reference to the accompanying drawings, wherein:

FIG. 4 is a sectional and enlarged scale view of a device of the transmission assembly of FIGS. 2 and 3;

FIG. 5 is a perspective cutaway view of a portion of a transmission assembly according to a second embodiment of the present invention;

FIG. 6 is a perspective view of a portion of the device of FIG. 4;

FIG. 7 is a perspective view of a portion of a transmission assembly according to a third embodiment of the present invention;

FIG. 8 is a perspective view of a portion of a transmission assembly according to a fourth embodiment of the present invention;

FIG. 9 is a perspective view of a portion of the transmission assembly shown in FIG. 5; and FIG. 10 is a sectional view of a portion of a transmission assembly according to a fifth embodiment of the present invention.

DESCRIPTION OF EMBODIMENTS

Figure 1:
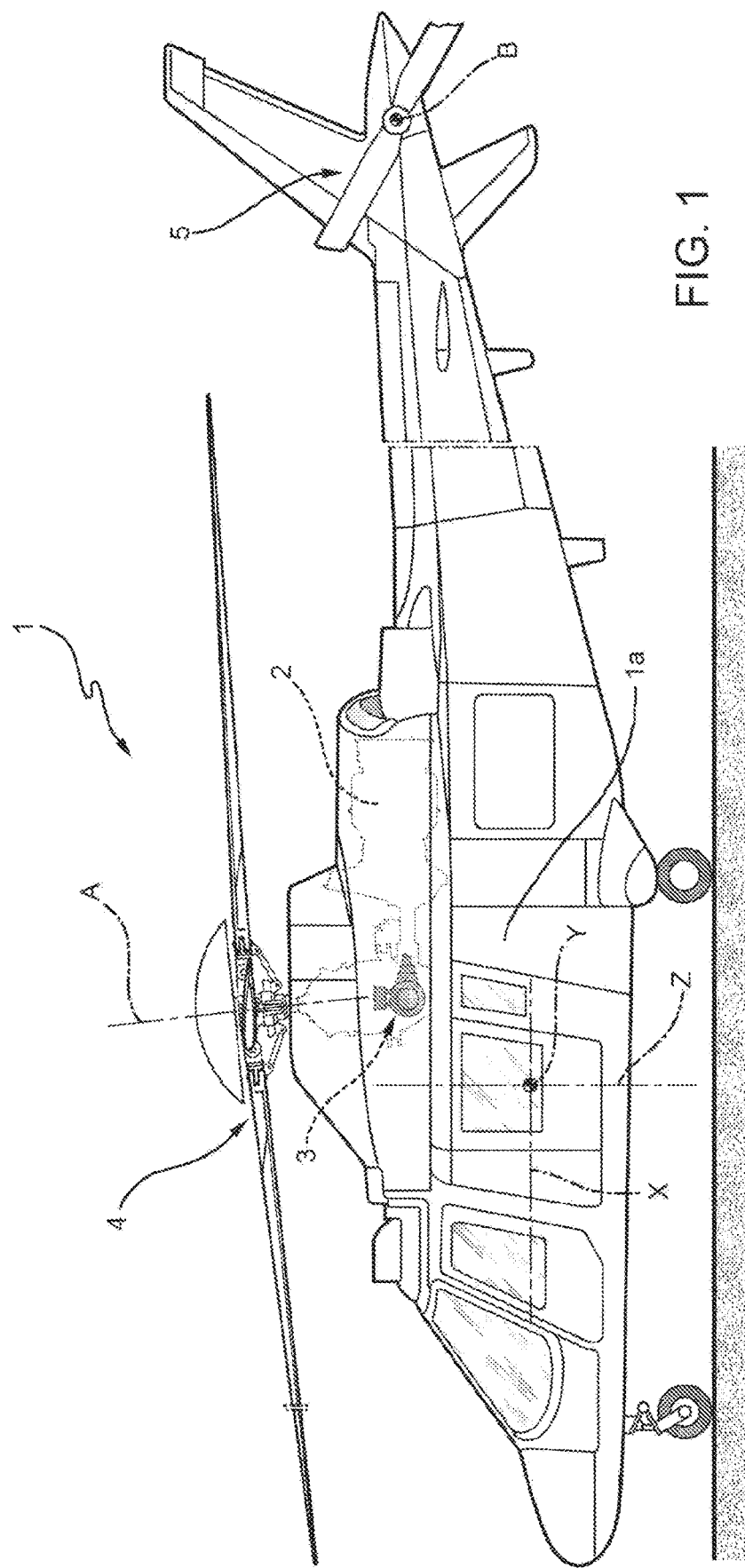
FIG. 1 is a side view of a helicopter comprising a transmission assembly according to the present invention.

With reference to FIG. 1, 1 denotes an aircraft capable of hovering. In the embodiment shown, the aircraft is a helicopter. Alternatively, the aircraft is a convertiplane.

In the remainder of this description, expressions such as "forward", "rearward", "upper" and "lower" are used with reference to a forward direction of flight and a normal operating position of the aircraft 1 shown in the accompanying figures. It is also possible to define a reference system integral with aircraft 1 itself and comprising (FIG. 1):
a longitudinal axis X;
a transverse axis Y, which is orthogonal to the axis X; and
an axis Z orthogonal to the axes X and Y and directed vertically to the ground during a normal condition of use of the aircraft 1.

The aircraft 1 comprises:
a fuselage 1a;
one or more turbines 2;
a main rotor 4 placed at a top of the fuselage 2 and rotatable around an axis A; and
an anti-torque rotor 5 placed at a tail end of the fuselage 2 and rotatable around its own axis B transverse to the axis A.

The helicopter 1 further comprises a transmission assembly 3, which transmits the motion from the turbines 2 to the main rotor 4. This transmission assembly 3 in turn comprises (FIG. 2):
an outer casing 8 constrained to a fixed structure (not shown) of the helicopter 1;
a drive shaft 7 mounted inside the casing 8 rotatably around a rotation axis C and adapted to operatively connect the turbines 2 with further components of the transmission assembly 3 itself, for example a toothed wheel 19; and
support means radially interposed between the shaft 7 and the casing 8 to support the shaft 7 in an axially fixed and angularly movable manner inside the casing 8 itself.

The aforesaid support means comprise a plurality of bearings 9.

Figure 2:
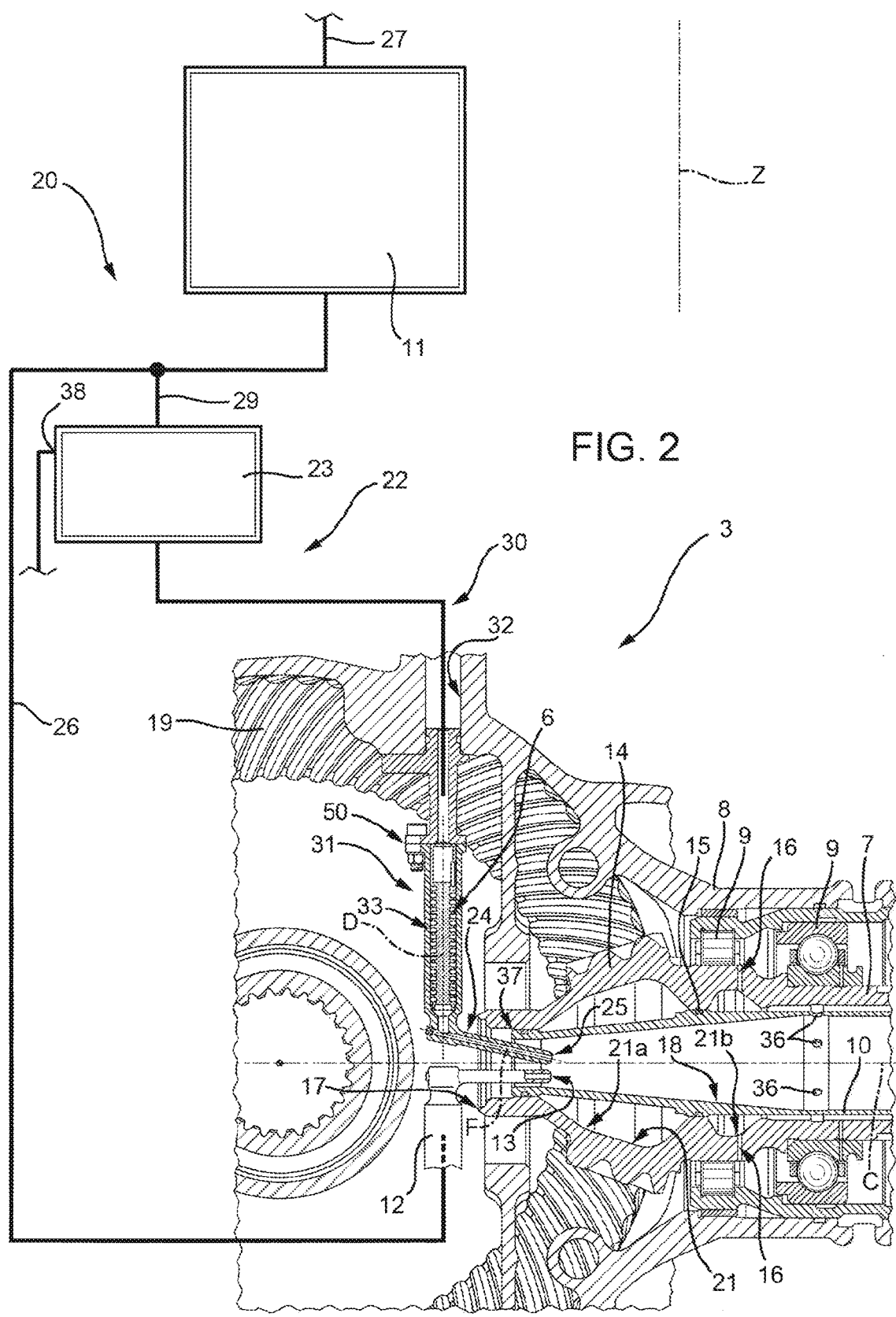
FIG. 2 is a sectional view of a portion of the transmission assembly of FIG. 1 according to a first embodiment of the present invention.

In addition, the shaft 7 comprises a toothed wheel 14, which meshes with the toothed wheel 19 (FIG. 2).

The transmission assembly 3 further comprises a primary lubrication circuit 20 and an emergency lubrication circuit 22 for lubricating the transmission assembly 3 itself and, in particular, the bearings 9.

The primary lubrication circuit 20 comprises (FIG. 2):
a primary tank 11 of a lubricating fluid, e.g. oil;
a primary nozzle 12 to supply lubricating fluid to a portion of the transmission assembly 3, and in particular to the bearings 9; and
a fluidic line 26, which fluidically connects the primary tank 11 to the primary nozzle 12.

The primary lubrication circuit 20 further comprises a fluidic feeding line 27, through which the lubricating oil is introduced into the primary tank 11. In particular, the fluidic line 27 could comprise a pump—known in itself and not shown—adapted to recirculate the lubricating oil collected downstream of the bearings 9 in the tank 11.

Figure 3:
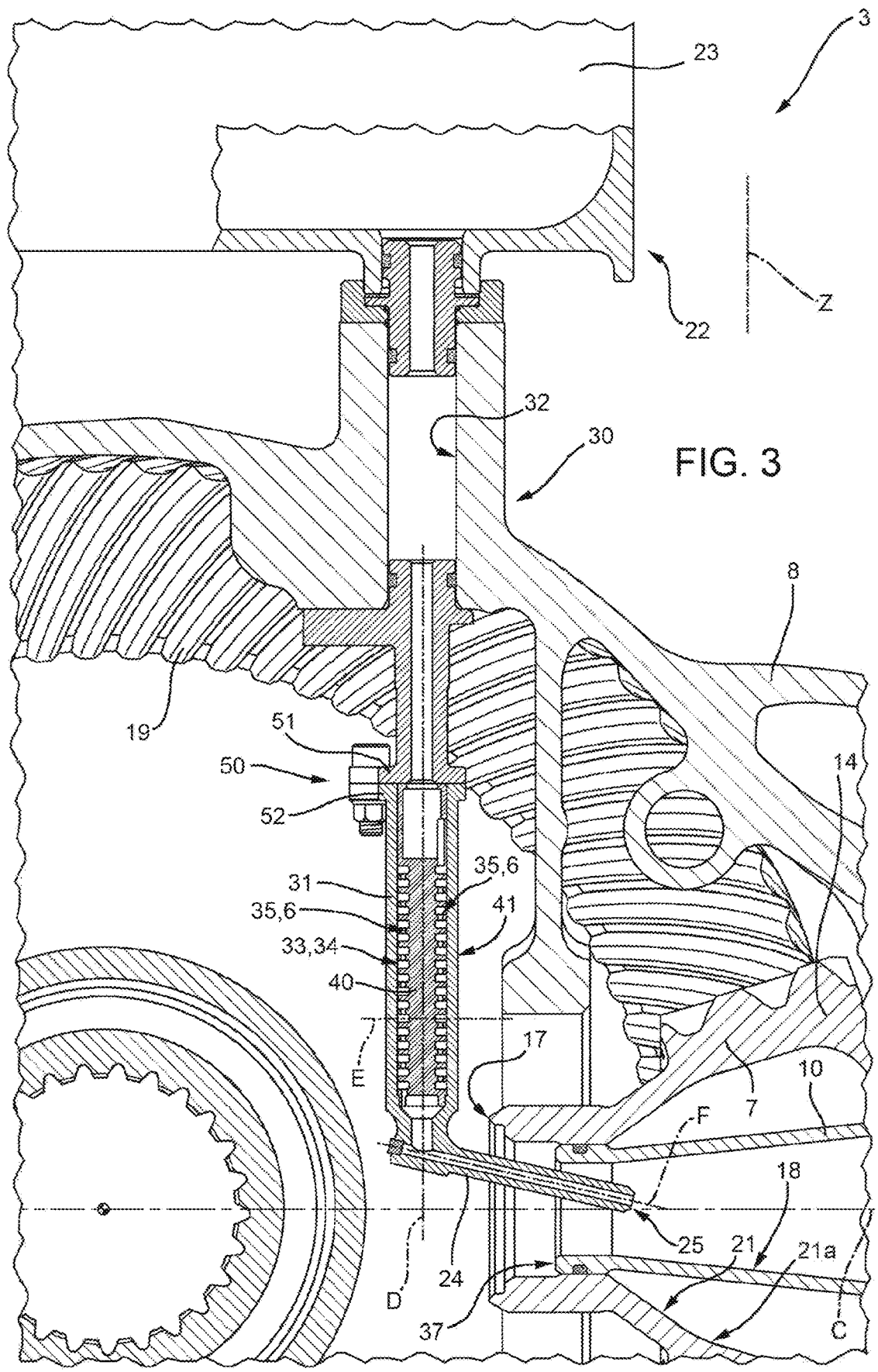
FIG. 3 is a detail view of FIG. 2 with parts removed for clarity's sake.

As shown in FIGS. 2 and 3, the shaft 7 defines, coaxially and internally, a compartment 21, which is open, at its axial end 17 facing the toothed wheel 19, to allow the supply of lubricating oil inside it. Preferably, the shaft 7 is closed at an axial end thereof opposite the axial end 17 along the axis C, so as to prevent the lubricating oil from escaping through said opposite axial end.

The compartment 21 is fluidically connected to the bearings 9 through a plurality of conduits 16, which are radially obtained in a pass-through manner in the shaft 7 to allow the supply of the incoming lubricating oil from the end 17 to the bearings 9. The toothed wheel 14 is furthermore arranged in proximity of the end 17.

In the case shown, the transmission assembly 3 comprises a further shaft 10 arranged within the compartment 21, in particular coaxially with the axis C.

As shown in FIGS. 2 and 3, the shaft 10 defines, in turn, coaxially and internally, a compartment 18, which is open, at an axial end 37 thereof arranged on the side of the axial end 17, to allow the lubricating oil to be supplied internally.

The compartment 18 is fluidically connected to the compartment 21 through a plurality of conduits 36, which are radially obtained in a pass-through manner in the shaft 10 (FIG. 2). Consequently, the compartment 18 is indirectly fluidically connected to the bearings 9 through the conduits 36 and the conduits 16.

The nozzle 12 has an outlet mouth 13 protruding inside the compartment 18 through the ends 17 and 37, so as to eject the oil necessary for lubricating the bearings 9 directly inside the compartment 18 itself.

More particularly, the compartment 21 comprises (FIG. 2):
a portion 21a, at the toothed wheel 14; and
a portion 21b, which is opposite the axial end 17 with respect to the portion 21a along the axis C.

Preferably, the bearings 9 are arranged along the axis C in proximity of the portion 21b.

The transmission assembly 3 further comprises a sealing element 15, for example an elastomeric O-ring, interposed radially between the shaft 7 and the shaft 10 and axially between the portion 21a and the portion 21b. The sealing element 15 prevents fluidic communication between the portion 21a and the portion 21b.

In addition, the shaft 10 does not comprise any conduits 36 at the portion 21a and the shaft 7 does not comprise any conduits 16 at the portion 21a. The conduits 16 and 36 are obtained only at or near the portion 21b. Thus, the lubricating oil emitted by the nozzle 12 can only reach the portion 21b, which is in proximity of the bearings 9.

According to an alternative embodiment not shown, wherein the transmission assembly 3 does not comprise the shaft 10, the nozzle 12 is arranged so as to eject the lubricating oil directly into the compartment 21.

Preferably, moreover, the primary lubrication circuit 20 is under pressure, whereby the tank 11 could be placed at a lower position than the outlet mouth 13.

The emergency lubrication circuit 22 comprises (FIG. 2):
an emergency lubricating oil tank 23, which is fluidically connected to the primary tank 11; and
auxiliary fluidic supply means 30 for supplying lubricating oil from the emergency tank 23 to a portion of the transmission assembly 3, and in particular to the bearings 9.

The emergency tank 23 is fluidically connected to the primary tank 11 by means of a fluidic line 29 (FIG. 2). In the shown embodiment, the fluidic line 29 is a branch of the fluidic line 26. Otherwise, the fluidic line 29 could extend directly starting from the primary tank 11.

Preferably, the fluidic line 29 is under pressure.

In a correct operating condition of the main lubrication circuit 20, the emergency tank 23 is continuously fed by the main tank 11. This means that in such a correct operating condition, as long as the main tank 11 contains lubricating oil, at least part of this lubricating oil is intended to flow into the emergency tank 23.

The auxiliary fluidic supply means 30 comprise, in turn, an emergency nozzle 24 for supplying lubricating oil to the bearings 9 and having an outlet mouth 25 (FIGS. 2 and 3).

More precisely, the emergency tank 23 is placed at a higher height than the outlet mouth 25, so that such dripping is facilitated by the action of the force of gravity. Thus, ultimately, the emergency lubrication circuit 22 is a passive type lubrication circuit.

The emergency lubrication circuit 22 further comprises an overflow 38, which is adapted to discharge a portion of the lubricating oil from the tank 23 when the oil exceeds a certain level inside the tank 23. By way of example, the lubricating oil discharged from the overflow 38 could be introduced into the tank 11.

The overflow 38 also acts as a vent for the air contained inside the tank k 23. In particular, the overflow 38 prevents the air pressure contained in the tank 11 from differing from the air pressure present in the rest of the emergency lubrication circuit 22. More particularly, the overflow 38 prevents a vacuum from being established at the tank 23.

Advantageously, the auxiliary fluidic supply means 30 comprise a dosing device 31 and a conduit 32, which fluidically connects the emergency tank 23 with the dosing device 31 (FIGS. 2 and 3);
the dosing device 31 comprises a passage 33 for the lubricating oil from the conduit 32 to the nozzle 24, and said passage 33 defines a plurality of concentrated pressure drop sections 6 of the lubricating oil;
said concentrated pressure drop sections 6 are distinct and spaced apart from each other.

The dosing device 31 is therefore fluidically interposed between the conduit 32 and the nozzle 24 and is adapted to slow down the flow of lubricating oil directed from the emergency tank 23 to the nozzle 24.

Concentrated pressure drop sections are to be understood as stretches of the passage 33 at which the hydraulic load of the flow of lubricating oil is reduced.

The change in hydraulic load occurring at the pressure drop sections 6 is due, for example, to changes in the cross-section of the passage 33 and/or changes in the direction imparted to the flow by the passage 33.

The passage 33 also causes a decrease in the hydraulic load of the flow of lubricating oil due to distributed pressure drops. These distributed pressure drops are due to the friction of the walls of the passage 33 and are correlated—in a known way—to the dimensions of the passage 33, to the speed and to the viscosity of the lubricating oil and to the roughness of the inner walls of passage 33. In addition, it should be noted that the viscosity of the lubricating oil is strongly influenced by temperature. Therefore, the magnitude of the distributed pressure drops is also correlated to the temperature of the lubricating oil.

Ultimately, the overall pressure drop imparted by the dosing device 31 to the flow of lubricating oil is equal to the sum of the concentrated pressure drops imparted to the flow at the pressure drop sections 6 and the distributed pressure drops. In general, considering a conduit having length L and (equivalent) diameter $\Phi$, the contribution of the distributed pressure drops is not negligible when the ratio of length L to diameter $\Phi$ is greater than or equal to 5 (L/$\Phi \geq 5$).

In detail, the dosing device 31 is configured so that during the passage of the lubricating oil through the passage 33, the contribution of the distributed pressure drops is negligible compared to the contribution of the concentrated pressure drops. In other words, the ratio of the length of the passage 33 to the equivalent diameter of the passage 33 is lower than 5.

A longitudinal axis D of the dosing device 31 can be defined. In particular, the displacement vector of a particle of lubricating oil between the inlet and the outlet of the dosing device 31 is directed substantially parallel to the axis D.

The dosing device 31 is arranged such that the longitudinal axis D is parallel or substantially parallel to the axis Z integral with the aircraft 1 in an operating condition in which the aircraft 1 is in forward flight and in a normal operating position. The dosing device 31 is therefore arranged parallel or substantially parallel to the gravity acceleration vector.

In addition, the nozzle 24 extends starting from the dosing device 31 along a direction F that is transverse, in particular oblique, with respect to the axis D.

As shown in FIG. 3, the conduit 32 and the passage 33 define respective passage sections for the lubricating oil in a direction orthogonal to the direction of the oil flow. Such passage sections have respective different extensions to each other. Preferably, the minimum passage section of the passage 33 has a smaller extension than the extension of the minimum passage section of the conduit 32. In the case shown, moreover, the conduit 32 is arranged coaxially to the axis D.

Preferably, moreover, the passage section orthogonal to the flow of lubricating oil of the nozzle 12 has a smaller extension than the passage section orthogonal to the flow of the nozzle 24.

As shown in FIGS. 2 to 4, the device 31 comprises a main body 40 and a casing 41, which surrounds the main body 40.

Said main body 40 defines with respect to the casing 41 an interstice 34, which is a portion of space radially interposed between the main body 40 and the casing 41 and which defines at least in part the passage 33. In other words, the lubricating oil directed from the conduit 32 to the nozzle 24 flows through at least part of the interstice 34.

Preferably, moreover, the main body 40 is obtained from a cylindrical bar.

The casing 41 comprises a radially inner cylindrical surface 41a and radially facing the main body 40 (FIG. 4). In addition, the main body 40 and the radially inner surface 41a are arranged coaxially to each other and to the axis D.

Preferably, the dosing device 31 comprises a radial clearance 48 between the main body 40 and the radially inner surface 41a (FIG. 4). This radial clearance 48 facilitates the insertion of the main body 40 into the casing 41 and ensures coaxiality between the main body 40 and the radially inner surface 41a.

However, the radial clearance 48 has dimensions such as to make the leakages of lubricating oil through the radial clearance 48 itself negligible. In detail, the main body 40 is releasably couplable to the casing 41. In more detail, the main body 40 is releasably inserted within the casing 41. Thus, it is possible to replace the main body 40 by the dosing device 31, without having to replace the casing 41.

In the case shown, the casing 41 and the nozzle 24 form a single piece. However, the casing 41 and the nozzle 24 could be formed from two distinct components. In particular, the nozzle 24 could be removably couplable to the device 31.

Furthermore, as shown in FIGS. 2 and 3, the casing 41 is a body distinct from the casing 8. However, according to an alternative embodiment not shown, the casing 8 comprises the casing 41. In particular, according to this alternative embodiment, the casing 8 comprises a cylindrical hole within which the main body 40 is housed and which is in fluidic communication with the conduit 32. In particular, the cylindrical hole comprises a cylindrical inner surface and the main body 40 is arranged coaxially to this cylindrical inner surface. Therefore, according to this alternative embodiment, the portions of the casing 8 defining the cylindrical hole constitute the casing 41.

The main body 40 further comprises a plurality of orifices 35, which form part of the interstice 34 and which will be described in detail below.

Specifically, the main body 40 comprises:
a central member 42, preferably having a cylindrical shape with axis D; and
a plurality of disks 43, extending radially from the central element 42 with respect to the axis D.

The disks 43 are spaced from each other along the axis D. Preferably, the distance of each disk 43 from the next one along the axis D is the same for all the disks 43.

Each disk 43 also has a circular section in a respective plane perpendicular to the axis D. The disks 43 are concentric with each other and with the axis D. In addition, the central element 42 and the disks 43 are formed as a single piece.

Each disk 43 comprises, in particular (FIGS. 6 to 9):
a radially outer profile 43a with respect to the axis D, which constitutes the radially outermost portion of the main body 40;
two faces 43b, 43c orthogonal to the axis D and opposite each other along the axis D; and
one or more orifices 35 each passing through a relative disk 43 parallel to the axis D.

Preferably, the faces 43b, 43c are flat and parallel to each other. In addition, the disks 43 have the same axial extension parallel to the axis D.

However, according to an embodiment not shown, the faces 43b and 43c could be arranged transversely to each other. In particular, according to this embodiment, the extension of the disks 43 parallel to the axis D decreases by proceeding radially from the axis D towards the radially outer profile 43a.

Each radially outer profile 43a is spaced radially from the radially inner surface 41a by the radial clearance 48.

Preferably, the disks 43 have the same radial extension with respect to the axis D. In this way, the leakages of the lubricating oil through the radial play 48 are limited. Furthermore, as shown in FIG. 6, each orifice 35 is a radially inner hole with respect to the relative radially outer profile 43a. In particular, each of the orifices 35 is a circular hole. Preferably, moreover, all the orifices 35 have an equal diameter to each other.

Each disk 43 of the main body 40 comprises a single orifice 35. The orifice 35 of each disk 43, moreover, is diametrically opposite to the orifice 35 of the consecutive disk along the axis D.

As shown in FIG. 4, it is possible to define a volume 44 delimited axially by the faces 43b, 43c facing each other of two consecutive disks 43 along the axis D and radially between the central element 42 and the radially inner surface 41a.

Each orifice 35 shown in FIG. 6 fluidically connects two axially consecutive volumes 44 to each other along the axis D. Therefore, the interstice 34 is defined by the volumes 44, by the volume delimited by the orifices 35 and by the radial clearance 48.

The dosing device 31 further comprises (FIG. 4):
a groove 46 at the disk 43 closest to the conduit 32; and
a groove 47 at the disk 43 closest to the nozzle 24.

The groove 46 fluidically connects the conduit 32 to the volume 44 closest to the conduit 32; the groove 47 fluidically connects the volume 44 closest to the nozzle 24 to the nozzle 24 itself.

More particularly, the faces 43b, 43c of the disks 43 and the radially inner surface 41a are adapted to guide the flow of lubricating oil parallel to a plane substantially perpendicular to the axis D; the orifices 35 are adapted to guide the flow of lubricating oil in a direction substantially parallel to the axis D. By virtue of the change of direction imparted to the flow at the orifices 35, these orifices 35 constitute the concentrated pressure drop sections 6 of the lubricating oil.

Further, the passage section for the lubricating oil at the volumes 44 is greater than the passage section of each orifice 35. Therefore, the orifices 35 constitute the concentrated pressure drop sections 6 of the lubricating oil also by virtue of the reduction of the extension of the passage section.

The passage section of each orifice 35 also preferably has a smaller extension than the extension of the minimum passage section of the nozzle 24.

At the same time, the passage section of each orifice 35 has an equivalent diameter greater than the average diameter of the air bubbles within the emergency lubrication circuits of transmission assemblies, which has been estimated between 0.5 and 1.0 mm.

Preferably, the equivalent diameter of each orifice 35 is greater than or equal to 1.5 mm.

The dosing device 31 can be releasably coupled to the conduit 32. In particular, the transmission assembly 3 comprises fixing means 50 for releasably coupling the dosing device 31 to the conduit 32.

In particular, the conduit 32 comprises a flange 51 at an axial end thereof turned towards the dosing device 31 and the dosing device 31 comprises a flange 52 at an axial end thereof turned towards the conduit 32. The fixing means 50 comprise, for example, threaded connection elements for connecting the flange 52 to the flange 51.

Since the dosing device 31 is releasably couplable to the conduit 32, the dosing device 31 and the nozzle 24 constitute an upgrade kit for existing transmission assemblies.

In use, the shaft 7 rotates about the axis A with respect to the casing 8 and is supported by the bearings 9.

The lubricating oil contained in the tank 11 is partly supplied into the compartment 18 through the fluidic line 26 and the nozzle 12 and partly discharged into the tank 23 through the fluidic line 26 and the fluidic line 29.

The lubricating oil collected in the tank 23 is in turn supplied into the compartment 18 through the conduit 32, the dosing device 31 and the nozzle 24. In detail, when crossing the dosing device 31, the lubricating oil passes through the passage 33 and is subjected to a plurality of concentrated pressure drops.

In more detail, the lubricating oil from the conduit 32 passes through the groove 46 within the volume 44 closest to the conduit 32. Once inside the volume 44, the lubricating oil is guided by the walls 43b and/or 43c of the disks 43 facing each other and by the radially inner surface 41a. Subsequently, the lubricating oil reaches the orifice 35 and crosses it parallel to the axis D, undergoing a concentrated pressure drop. After crossing the orifice 35, the lubricating oil reaches the volume 44 arranged in succession along the axis D.

Once the lubricating oil has reached the volume 44 closest to the nozzle 24, it passes through the groove 47 and reaches the nozzle 24.

The flow of lubricating oil slowed down by the dosing device 31 then reaches the nozzle 24 and flows out into the compartment 18.

The lubricating oil supplied by the primary and emergency lubrication circuits in the compartment 18 passes successively through the radial conduits 36 and the radial conduits 16 and reaches the bearings 9.

During operation of the transmission assembly 3, any air bubbles carried by the flow of lubricating oil through the dosing device 31 can easily rise up through the passage 33, avoiding clogging the nozzle 24.

This is possible firstly because the equivalent diameter of the orifices 35 is greater than the average diameter of the air bubbles. Secondly, the rising of the bubbles due to the difference between the specific weight of the lubricating oil and the air enclosed in the bubbles is facilitated by the fact that the axis D is substantially parallel to the axis Z.

During a correct operating condition, the tank 11 is continuously fed through the fluidic line 27 and continuously feeds the tank 23.

Conversely, during an emergency condition in which there is no oil flowing out of the nozzle 12, the tank 23 is not fed with lubricating oil from the tank 11 and starts emptying. In particular, the lubricating oil collected in tank 23 continues to be supplied to the bearings 9, until the tank 23 itself is completely emptied.

In particular, by virtue of the slowdown that the dosing device 31 imposes on the lubricating oil, the lubrication of the bearings 9 continues even after the instant in which the tank 23 is completely empty.

With reference to FIGS. 5 and 9, 3' denotes a transmission assembly according to a second embodiment of the present invention. The transmission assembly 3' is similar to the transmission assembly 3 and will be described hereinafter only insofar as it differs from the latter; equal or equivalent parts of the transmission assemblies 3, 3' will be marked, where possible, by the same reference numerals.

The transmission 3' differs from the assembly transmission assembly 3 in that it comprises a dosing device 31' having a main body 40' in which the orifices 35 are formed at the radially outer profile 43a. In detail, each orifice 35 is a groove directed parallel to the axis D. In further detail, each orifice 35 has a C-shaped section in a plane orthogonal to the axis D.

In particular, the main body 40' comprises disks 43 each having a single orifice 35. The orifice 35 of each disk 43, moreover, is diametrically opposite to the orifice 35 of the consecutive disk along the axis D.

According to this second embodiment, the interstice 34 comprises:
the space axially interposed between the faces 43b, 43c facing each other of each pair of consecutive disks 43 and radially between the central element 42 and the radially inner surface 41a;
the space radially interposed between the orifices 35 and the radially inner surface 41a; and
the radial clearance 48.

The dosing device 31', moreover, is configured so that during the passage of the lubricating oil through the passage 33, the contribution of the distributed pressure drops is negligible compared to the contribution of the concentrated pressure drops.

The operation of the transmission assembly 3' is similar to that of the transmission assembly 3 and will be described hereinafter insofar as it differs from it.

In particular, the oil coming from the conduit 32 is guided by the face 43b of the disk 43 closest to the conduit 32 and by the radially inner surface 41a towards the orifice 35. Subsequently, the lubricating oil passes through the orifice 35 parallel to the axis D, undergoing a concentrated pressure drop and heading towards the next disk 43 along the axis D until it reaches the nozzle 24.

With reference to FIG. 7, 3" denotes a transmission assembly according to a third embodiment of the present invention. The transmission assembly 3" is similar to the transmission assembly 3' and will be described hereinafter only insofar as it differs from the latter; equal or equivalent parts of the transmission assemblies 3', 3" will be marked, where possible, by the same reference numerals.

The transmission assembly 3" differs from the transmission assembly 3' in that it comprises a dosing device 31" having a main body 40" in which the disks 43 each have two orifices 35 angularly spaced from each other with respect to the axis D. In more detail, the two orifices 35 are spaced by 180° from each other. The orifices 35 of each disk 43 are also aligned with the orifices 35 of all the other disks 43 of the main body 40 parallel to the axis D.

The dosing device 31", moreover, is configured so that during the passage of the lubricating oil through the passage 33, the contribution of the distributed pressure drops is negligible compared to the contribution of the concentrated pressure drops.

The operation of the transmission assembly 3" is similar to that of the transmission assembly 3' and will therefore be described in detail below insofar as it differs from it.

In particular, the oil coming from the conduit 32 is guided by the face 43b of the disk 43 closest to the conduit 32 and by the radially inner surface 41a towards the orifice 35. Subsequently, the lubricating oil crosses the orifice 35 parallel to the axis D, undergoing a concentrated pressure drop and heading towards the next disk 43 along the axis D until it reaches the nozzle 24.

With reference to FIG. 8, 3''' denotes a transmission assembly according to a fourth embodiment of the present invention. The transmission assembly 3''' is similar to the transmission assemblies 3', 3'' and will be described hereinafter only insofar as it differs from the latter; equal or equivalent parts of the transmission assemblies 3', 3'', 3''' will be marked, where possible, by the same reference numerals.

The transmission assembly 3''' differs from the transmission assembly 3' in that it comprises a dosing device 31''' having a main body 40''' in which the disks 43 each have four orifices 35 angularly spaced from each other by 90° with respect to the axis D. The orifices 35 of each disk 43 are also aligned with the orifices 35 of all the other disks 43 of the main body 40''' parallel to the axis D.

The dosing device 31''' is also configured so that the contribution of distributed pressure drops is negligible compared to the contribution of concentrated pressure drops.

The operation of transmission assembly 3''' is similar to that of transmission assembly 3'' and will therefore not be described in detail.

With reference to FIG. 10, 31'''' is denoted according to a fifth embodiment of the present invention. The transmission assembly 3'''' is similar to the transmission assembly 3 and will be described hereinafter only insofar as it differs from the latter; equal or equivalent parts of the transmission assemblies 3, 3'''' will be marked, where possible, by the same reference numerals.

The transmission assembly 3'''' differs from the transmission assembly 3 in that it comprises a dosing device 31'''' comprising a hollow main body 40'''', within which the passage is obtained. In particular, the main body 40'''' could be housed in a seat of the casing 8.

Similar to the main body 40, the main body 40''' ' has a cylindrical shape with axis D.

The passage 33'''' is a conduit and comprises, in turn:
an entry segment 33a'''' arranged on the side of the conduit 32;
an exit segment 33b'''', which is axially opposite to the entry segment 33a'''' along the axis D;
at least one intermediate segment 33c'''' and at least one intermediate segment 33d'''' arranged axially in succession between the entry segment 33a'''' and the exit segment 33b''''.

Each intermediate segment 33c'''' extends parallel to the longitudinal axis D and each intermediate segment 33d'''' extends parallel to a direction E transverse to the axis D. It is also possible to define a plane P passing through the axis D and orthogonal to the axis E. In addition, it is possible to define two sides 61'''', 62'''' of the dosing device 31'''' opposite each other with respect to the plane P (FIG. 10).

The conduit 33'''' also comprises a plurality of transition sections 33e'''', at which the intermediate segments 33c'''' and 33d'''' are joined together. By virtue of the change in direction imparted to the flow at the transition sections 33e'''', these transition sections 33e'''' constitute concentrated pressure drop sections 6'''' of the lubricating oil.

In the case shown, the passage 33'''' has a coil pattern in an axial plane of the dosing device 31'''' perpendicular to the plane P. The extension of this coil parallel to the axis D is greater than its extension parallel to the direction E.

In particular, the entry segment 33a'''' and the exit segment 33b'''' are coaxial with each other and with the axis D. The segments 33c''' ' are radially spaced from the axis D and all preferably have the same extension parallel to the axis D. All the segments 33d''' ', moreover, have the same extension parallel to the direction E.

More particularly, the passage 33'''' comprises a plurality of intermediate segments 33c'''' and 33d''' ' arranged in succession in modules 53'''' that are repeated along the axis D.

Each module 53'''' comprises (FIG. 10):
a first intermediate segment 33c'''' arranged on the part of the side 61'''';
a second intermediate segment 33c'''' arranged on the part of the side 62'''' and in succession after the first segment 33c'''' along the axis D;
a third intermediate segment 33d'''', joining the first intermediate segment 33c'''' to the second intermediate segment 33c''''; and
a fourth intermediate segment 33d'''', which extends starting from the second intermediate segment 33c'''' from the first side 61'''' to the second side 62''''.

In particular, the fourth intermediate segment 33d'''' joins the second intermediate segment 33c'''' of the module 53'''' to the first intermediate segment 33c'''' of the next module 53'''' along the axis D.

In addition, the distance between each first intermediate segment 33c'''' from plane P is equal to the distance between each second intermediate segment 33c'''' from plane P.

Preferably, the extension of the passage section 33'''' in the direction perpendicular to the oil flow is constant. The equivalent diameter of this passage section is also greater than the average diameter of the air bubbles within the emergency lubrication circuits of transmission assemblies. Preferably, the equivalent diameter of the passage 33'''' is greater than or equal to 1.5 mm.

In particular, the dosing device 31'''' could be made by an additive manufacturing process.

The operation of the transmission assembly 3'''' is similar to that of the transmission assembly 3 and will be described hereinafter insofar as it differs from it.

In particular, the lubricating oil coming from the conduit 32 passes in succession through the entry segment 33a'''', the intermediate segments 33c'''' and 33d'''' and flows out through the exit segment 33b''''. In particular, as it passes through each of the transition sections 33e'''', the lubricating oil undergoes a respective concentrated pressure drop. In addition, the lubricating oil undergoes a distributed pressure drop due to the roughness of the inner walls of the conduit 33''''. In the specific case of the transmission assembly 3'''', this distributed pressure drop is not negligible. Once the lubricating oil has flown out from the exit segment 33b'''', it reaches the nozzle 24.

From an examination of the characteristics of the transmission assembly 3, 3', 3'', 3''', 3'''' according to the present invention, the advantages that it allows obtaining are evident.

In particular, since the transmission assembly 3, 3', 3'', 3''', 3'''' comprises a dosing device 31, 31', 31'', 31''', 31'''' fluidically interposed between the conduit 32 and the nozzle 24, and having a plurality of concentrated pressure drop sections 6, 6'''', the flow of lubricating oil is slowed down upstream of the nozzle 24.

Therefore, unlike the solutions of known type and described in the introductory part of the present description, it is possible to reduce the risk of the flow of lubricating oil being impeded by the air bubbles it carries. Flow stability and lubrication reliability in emergency conditions are thus improved.

Since the main body 40 is releasably couplable to the casing 41, it is possible to replace the main body 40, 40', 40", 40'" from the dispensing device 31, 31', 31", 31'" without replacing the casing 41. In particular, it is possible to insert into the casing 41 a main body 40, 40', 40", 40'" characterized by a different overall value of concentrated drops and to adjust the emptying time of the tank 23.

The dosing device 31, 31', 31", 31'", 31"" is also releasably connectable to the conduit 32. Therefore, it is readily possible to replace a dosing device 31, 31', 31", 31'", 31"" coupled to the conduit 32 with a different dosing device 31, 31', 31", 31'", 31"" and/or to facilitate the removal of the main body 40, 40', 40", 40'" from the casing 41.

Since the dosing device 31, 31', 31", 31'", 31"" is arranged substantially parallel to the direction Z, the descent of the lubricating oil—although slowed down in the pressure drop sections 6, 6""—is facilitated by gravity. In addition, for the same reason, the rising of any air bubbles through the dosing device 31, 31'", 31', 31"" is facilitated.

Finally, it is clear that modifications and variations can be made to the transmission assembly 3, 3', 3", 3'", 3"" described and shown herein without thereby departing from the scope of protection defined by the claims.

In particular, the transmission assembly 3, 3', 3", 3'", 3"" could be adapted to transmit motion from one or more turbines to a plurality of accessory devices designed, for example, to provide the energy necessary for the operation of the on-board equipment.

The passage 33"" may have different trends from the one shown in FIG. 10. For example, it could be made as spiral, zigzag or have irregular shapes.

The invention claimed is:

1. Transmission assembly for an aircraft capable of hovering, comprising:
   a first and a second member;
   support means adapted to support said first member movably with respect to said second member;
   a primary lubrication circuit and an emergency lubrication circuit of said support means;
   said primary lubrication circuit comprising a primary tank of a lubricating fluid and primary fluidic supply means for supplying said lubricating fluid to said support means;
   said emergency lubrication circuit comprising an emergency tank fluidically connected to said primary tank; and auxiliary fluidic supply means of said lubricating fluid to said support means, comprising a nozzle;
   wherein said auxiliary fluidic supply means further comprises a dosing device and a fluidic line fluidically connecting said emergency tank with said dosing device;
   said dosing device comprising a passage for said lubricating fluid from said fluidic line to said nozzle;
   said passage comprising a plurality of concentrated pressure drop sections of said lubricating fluid; said concentrated pressure drop sections being distinct and spaced apart from each other.

2. Transmission assembly according to claim 1, characterized in that said dosing device comprises:
   a main body; and
   a casing, which surrounds said main body;
   said dosing device further comprising an interstice interposed between said main body and said casing radially with respect to a first longitudinal axis (D) of said dosing device; said interstice defining at least in part said passage.

3. Transmission assembly according to claim 2, wherein said main body comprises a plurality of orifices directed parallel to said first longitudinal axis (D); said orifices being part of said interstice and defining respective said concentrated pressure drop sections.

4. Transmission assembly according to claim 3, wherein said main body comprises a central element and a plurality of disks extending radially from said central element with respect to said first longitudinal axis (D); said disks being spaced from each other along said first longitudinal axis (D); each of said disks comprising at least one said orifice.

5. Transmission assembly according to claim 4, wherein said disks comprise a radially outer profile with respect to said first longitudinal axis (D); each said orifice is a through hole arranged in a radially inner position with respect to the relative radially outer profile.

6. Transmission assembly according to claim 5, wherein each said disk comprises a plurality of said orifices angularly spaced from each other with respect to said first longitudinal axis (D).

7. Transmission assembly according to claim 4, wherein said disks comprise a radially outer profile with respect to said first longitudinal axis (D);
   characterized in that wherein each said orifice is obtained at the relative radially outer profile; each said orifice comprising a groove directed parallel to said first longitudinal axis (D).

8. Transmission assembly according to claim 2, wherein said main body is releasably couplable to said casing.

9. Transmission assembly according to claim 1, wherein said dosing device comprises a main body, which is hollow and within which said passage is obtained.

10. Transmission assembly according to claim 9, wherein said passage is a conduit comprising:
    at least a first segment extending parallel to said first longitudinal axis (D) of said dosing device;
    at least a second segment extending parallel to a direction (E), which is transverse to the said first longitudinal axis (D); and
    at least one transition segment, at which a said first segment is joined to a said second segment;
    said at least one transition segment defining a respective said concentrated pressure drop segment.

11. Transmission assembly according to claim 10, wherein said passage comprises a plurality of said first and second segments repeated modularly along said first longitudinal axis (D).

12. Transmission assembly according to claim 10, wherein said passage has a coil pattern in a plane of said dosing device passing through said first longitudinal axis (D);
    said coil having a first extension parallel to said first longitudinal axis (D) and a second extension parallel to said direction (E), said first extension being greater than said second extension.

13. Transmission assembly according to claim 1, wherein said dosing device is releasably couplable to said conduit.

14. Aircraft capable of hovering, comprising an integral reference system (X, Y, Z); said integral reference system (X, Y, Z) comprising:
    a second longitudinal axis (X);
    a third axis (Y) orthogonal to the said second axis (X);
    a fourth axis (Z) orthogonal to said second and third axes (X, Y) and directed, in use, vertically to the ground during a normal condition of use of said aircraft; and
    a transmission assembly according to claim 1;

wherein said first axis (D) is parallel or substantially parallel to said fourth axis (Z).

* * * * *